United States Patent [19]

Dimberio

[11] Patent Number: 4,852,763
[45] Date of Patent: Aug. 1, 1989

[54] BEVERAGE CONTAINER COVER

[76] Inventor: Donald J. Dimberio, 11416 Westwind Dr., Fort Wayne, Ind. 46845

[21] Appl. No.: 202,834

[22] Filed: Jun. 2, 1988

[51] Int. Cl.$^4$ .............................................. B65D 51/18
[52] U.S. Cl. .................................. 220/253; 220/90.2; 220/254; 220/258
[58] Field of Search ................... 220/90.2, 90.4, 90.6, 220/253, 258, 254, 373

[56] References Cited

U.S. PATENT DOCUMENTS

| | | |
|---|---|---|
| 1,896,976 | 2/1933 | Schifferdecker . |
| 2,459,558 | 1/1949 | Villegas de Oribe . |
| 2,615,610 | 10/1952 | White .................................. 220/258 |
| 2,693,685 | 11/1954 | Stafford ............................... 220/90.6 |
| 2,725,732 | 12/1965 | Somoza ............................... 220/90.6 |
| 3,182,393 | 5/1965 | Chevillon . |
| 3,204,805 | 9/1965 | May . |
| 3,826,400 | 7/1974 | Hougen et al. ...................... 220/253 |
| 4,030,630 | 6/1977 | Yealy . |
| 4,098,439 | 7/1978 | Blow, Jr. et al. ................... 220/90.6 |
| 4,256,239 | 3/1981 | Yamaguchi et al. ................ 220/258 |
| 4,285,442 | 8/1981 | Wedzik ............................... 220/90.4 |
| 4,415,097 | 11/1983 | Meins . |
| 4,611,725 | 9/1986 | Kacalieff ............................. 220/258 |
| 4,634,014 | 1/1987 | Carr .................................... 220/90.4 |
| 4,717,039 | 1/1988 | Ayyoubi . |
| 4,752,016 | 6/1988 | Eads ................................... 220/90.2 |

FOREIGN PATENT DOCUMENTS

| | | | |
|---|---|---|---|
| 298176 | 8/1932 | Italy .................................... 220/254 |
| 146730 | 4/1931 | Switzerland ........................ 220/254 |

Primary Examiner—Stephen Marcus
Attorney, Agent, or Firm—Jeffers, Hoffman & Niewyk

[57] ABSTRACT

A protective cover for a beverage container, which cover is both removable and reusable. The cover is intended to prevent bees and other contaminating objects from entering the container after the container has been initially opened. The cover comprises a flexible, resilient disc having a notch formed therein, whereby the disc may be inserted to fit conveniently in the recessed area on the top of the beverage container and underneath the tab. The cover is rotated to align the notch with the opening in the container so that the liquid in the beverage container is accessible to the consumer. Similarly, the cover may be further rotated so that it covers the opening and thereby prevents the entry of foreign objects into the container.

17 Claims, 2 Drawing Sheets

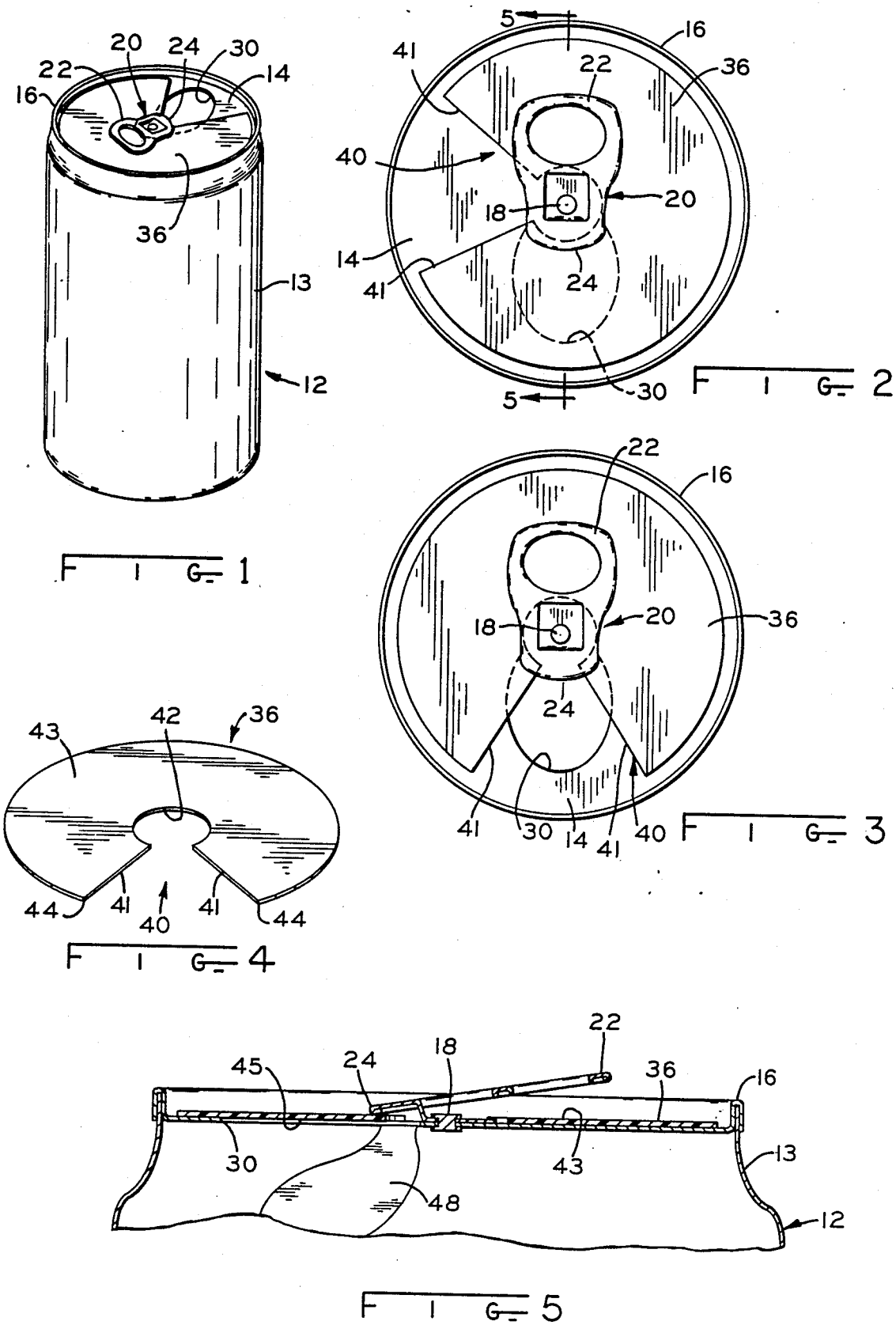

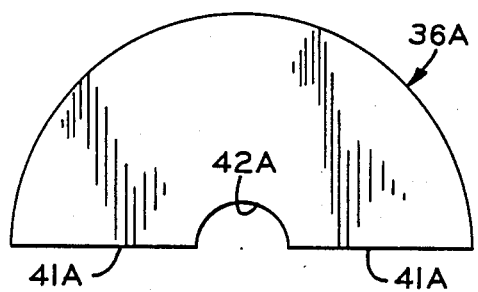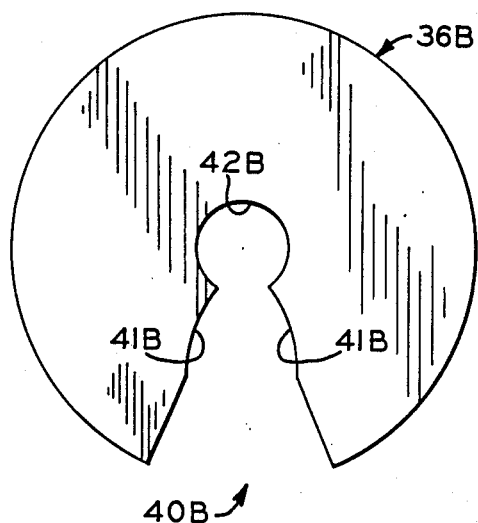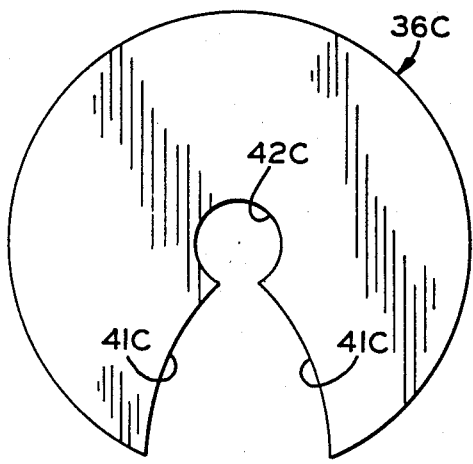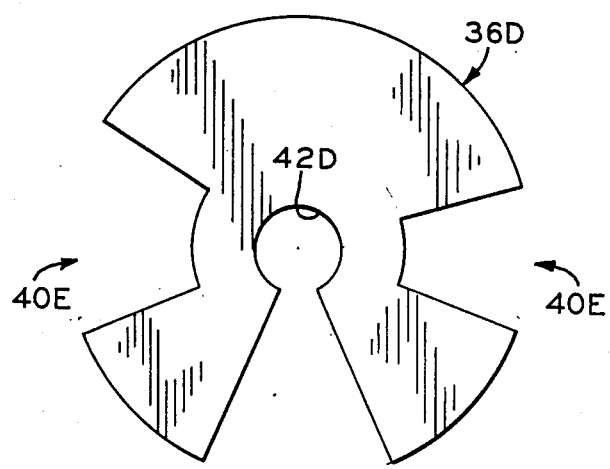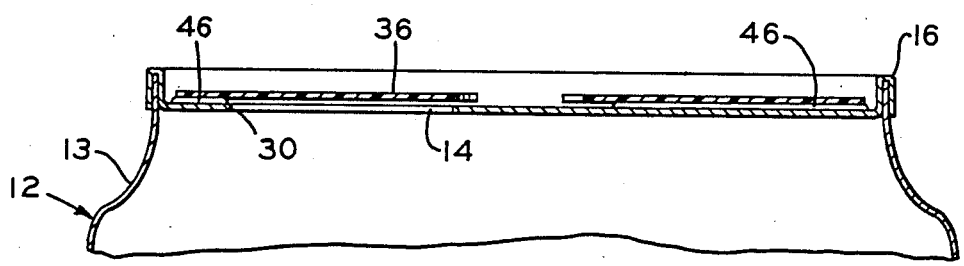

BEVERAGE CONTAINER COVER

BACKGROUND OF THE INVENTION

This invention relates to protective lids or covers for beverage containers, and more particularly, to beverage container covers that are removable and reusable Still more particularly, the invention relates to covers that are inserted onto the top of a beverage container after initial opening of the container, and are freely rotatable to cover and uncover the drinking opening of the container according to the desires of the consumer.

The popularity of certain beverage containers, such as soft drink cans, has grown enormously in recent years. It is commonplace now to see individuals consuming beverages from such containers during nearly any of the normal daytime activities. Certain inconveniences and health hazards are associated with the use of these containers, which to date have defied solution from the joint standpoints of cost and convenience.

When beverages are consumed outdoors at the beach, golf course, etc., there is a significant risk that bees or other flying insects may enter the containers. If this is not noticed by the person drinking the beverage, the bee can be swallowed, which can result in bee stings in the mouth and throat. There have been reported cases of persons dying from asphyxiation after having been stung by bees because of this problem. In addition, in many environments such as factories, hospitals, laboratories and the like, dust particles, germs and other potentially hazardous debris may enter the container and escape notice of the consumer. With the increasing spread of viruses and cancer-causing agents, and the diversity of means by which such contaminants may be carried, it is desired to minimize the exposure of the beverage to such contaminants to a greater extent than has heretofore been possible, yet at the same time to retain the convenience associated with the use of beverage containers of this type.

In addition to the hazards associated with objects entering the container, is the increasing awareness of the potential health hazards associated with the mistaken use by one person of another's beverage can. This can easily occur during occasions such as parties, meetings and the like, in which the possibility of confusion as to which container belongs to each person may cause an individual to mistakenly drink from the container of another. It is desirable to eliminate such mistaken use, to the fullest extent possible, due to the increasing prevalence of deadly viruses and diseases, which may be spread by the exchange of saliva.

Another problem associated with the use of such beverage containers is that of splashing or spilling the beverage from the can. These containers are frequently used during periods of transit, such as in automobiles, golf carts, and boats, and the possibility of splashing is ever present. Additionally, they are often used in settings involving large crowds, such as ball games and festivals, where the problem of jostling with the crowd may cause the beverage to be spilled.

There have been attempts made in the past to remedy these problems, however, the prior art in this field lacks an inexpensive, easily removable and reusable container cover such as the present invention.

U.S. Pat. No. 4,717,039 discloses a beverage container reclosing device comprising a semi-circular reclosing plate having an axial bore through which extends the central post of the can. The reclosing plate is assembled together with the can top, pull tab and central post at the time that the beverage container is originally sealed. The reclosing plate may be rotated to a covered or uncovered position as desired, however, the reclosing plate is a permanent feature of the container and, as such, it cannot be removed or re-used. When the beverage has been fully consumed and the container is discarded, the reclosing plate is likewise discarded. Since the cover cannot be removed and reused, it increases the cost of the container itself.

U.S. Pat. No. 4,415,097 relates to a drinking aid for a beverage can that is adapted to be snapped into place over the upper edge of the can to sealingly cover the entire surface of the lid of the can. The drinking aid is provided with a flexible nipple-like mouthpiece in the vicinity of the can opening that can be folded out for use in the nature of a straw, and be folded-in in the vicinity of the center surface of the cover when not in use. This drinking aid is intended to be snapped into place on the lid of the can prior to sale or distribution of the can, and is normally discarded at the time that the can is discarded. This drinking aid requires many working parts including the nipple, which are not required in the present application and which, accordingly, increases its costs.

It can be seen, therefore, that a need exists for an inexpensive, reusable beverage container cover that is easily inserted onto a container for use, and conveniently allows the consumer to cover and uncover the drinking opening as desired.

SUMMARY OF THE INVENTION

The present invention overcomes the disadvantages of the above described prior art by providing an inexpensive beverage container cover that can be inserted by the consumer after the container is opened, is easily removable from the container and is reusable.

This invention avoids the limitations associated with earlier beverage container covers. The cover of the present invention comprises a unitary planar disc having a notch formed therein. The cover is easily inserted onto the top of the container and under the pull tab for use, it is easily manipulated into the "covered" or "uncovered" position according to the desires of the consumer, and it is easily removed from the container for eventual reuse. The simple construction and the lack of any required appendages allows for simple manufacture. The small amount of material required for this invention, as well as the aforementioned ease of manufacture, result in significant cost advantages over the earlier inventions. Similarly, the fact that the cover is not installed as a permanent feature of the can, as in U.S. Pat. No. 4,717,039, results in further cost savings because the cover of the present invention may be used over and over.

Accordingly, there is provided herein a reusable beverage container cover comprising a generally planar disc having a notch formed therein. The cover may also contain a central aperture contiguous to the notch. The cover may be constructed from various materials, such as waxed cardboard, however a resilient, flexible plastic has been found advantageous. This cover may be easily inserted into place within the recessed area on top of the container, and between the tab portion of the container top and the top itself. This is accomplished by merely aligning the notch with the tab portion of the container top, bending the cover somewhat to advance the notch into said recessed area and underneath said tab, and sliding the cover into place so that it is completely disposed within the recessed area on the container top and underneath the tab. When inserted into this position, the cover is freely rotatable on the top of the container. The notch of said cover may be selectively positioned so that it alternately covers or uncovers the opening of said beverage container according to the desires of the consumer. The free rotatability of the cover allows this selective alignment to be accomplished by simple finger manipulation. When the consumer tilts the container in order to take a drink of the beverage, a film of the liquid from the container occupies the recessed area on the container top between the cover and said container top. This liquid film assists in adhering the cover to the container top and prevents the cover from drifting from the desired position. The ability of the cover to trap a film of liquid between it and the top of the container is enhanced by dimensioning the notch so that its edges slightly overlap the opening in the container.

One advantage of the present invention is that it provides an effective cover for a beverage container that will prevent bees and other undesired objects from entering the container after it has been opened.

Another advantage of the present invention is that it provides an effective cover for a beverage container that may be easily manipulated during use, and that may be easily inserted onto the container and likewise may be easily removed from the container.

The covers may be imprinted with advertising or other information or may be color coded so as to distinguish one person's beverage can from another.

A further advantage of the present invention is that it has virtually no bulk and may conveniently be carried in one's pocket when not in use.

Still another advantage of the present invention is that its simple construction and lack of movable parts renders it inexpensive to manufacture.

A still further advantage of the present invention is that it may be reused numerous times by the consumer.

The present invention, in one form thereof, comprises a reusable protective cover for use in combination with a beverage container having a top, a tab opener connected to said top for creating an opening through said top when said tab opener is actuated, and a circumferential upper edge disposed peripherally around the top and extending above the container top. The cover comprises a planar disc having a notch formed therein, the disc being removably disposed within a recessed area on said container top within the upper edge and underneath said tab opener with said disc being rotatable so that it selectively covers and uncovers the container opening according to the desires of the consumer.

In a preferred form, the disc ray have a circular aperture in the center thereof. In another preferred form, the disc may be formed from a flexible, resilient material, of which an FDA approved synthetic plastic, such as impact polystyrene has been found advantageous. A preferred thickness of from 0.005 to 0.070 inch is preferred, however, covers of greater or lesser thickness may also be employed.

In a preferred form, the notch forms a V extending from the edge of the disc toward the center of the disc. Other types of cut-outs from the disc may be employed to create the opening in said disc.

The invention, in accordance with another embodiment thereof, provides a method of covering a beverage container having a top with a tab opener associated with that top and an opening through the top. This method comprises providing a generally planar disc having a notch therein extending to an edge of the disc, inserting said disc between the top of the container and tab opener, and rotating the disc so that it alternatively covers and uncovers the opening in the container. The disc is preferably inserted by aligning the notch of the disc so that it faces the tab opener, bending the disc and advancing the notched portion of the disc so that it is disposed below the edge of the container and under the tab opener, and then sliding the disc into place so that it is completely disposed within the recessed area on the container top and underneath the tab.

BRIEF DESCRIPTION OF THE DRAWINGS

FIG. 1 is a perspective view of a beverage container with the cover of the present invention in place;

FIG. 2 is a plan view of the container with the cover rotated to the closed position;

FIG. 3 is a plan view of the container with the cover rotated to the open position;

FIG. 4 is an enlarged perspective view of a beverage container cover of the present invention;

FIG. 5 is a cross sectional view taken along line 5—5 of FIG. 2;

FIGS. 6, 7, 8, and 9 are plan views showing alternate embodiments of the beverage container cover of the present invention; and FIG. 10 is a cross sectional view of the beverage container with the cover in place and with a liquid film disposed between the cover and the top of a container not having a pull tab.

DETAILED DESCRIPTION OF THE PREFERRED EMBODIMENT

Referring to FIG. 1, there is shown a perspective view of a metal beverage container 12 with the beverage container cover of the present invention 36 installed thereon. Although FIG. 1 depicts the conventional type of beverage container that is currently in wide use, it will be understood that the beverage cover of the present invention will also be applicable to other containers of different sizes and designs.

With reference to FIGS. 1, 2 and 5, beverage container 12 has a metal sidewall portion 13 and a metal top 14 which is joined to the can to effect a seal therebetween. Top 14 includes a circumferential upper edge or lip 16 above sidewall portion 13 of the can 12. Substantially in the center of top 14 is a rivet 18 which connects pull tab 20 to top 14. Pull tab 20 has a handle portion 22 on one end and an opener edge 24 on the opposite end. When handle portion 22 is raised, the opener edge 24 is depressed against a seal plate 48 which is joined to top 14 by score lines. The pressure of opener edge 24 against seal plate 48 causes seal plate 48 to break loose at the score lines and bend inwardly as shown in FIG. 5, to create an opening 30 in the top of the container and thereby expose the interior of the container 12 so that the beverage is accessible to the consumer.

Referring now to FIG. 4, the cover 36 of the present invention is shown with a notch 40 formed therein. This cover is preferably manufactured from a flexible, resilient, material such as a polystyrene plastic, however it is not restricted to this type of material. A thickness of between 0.005 to 0.070 inch has been found acceptable for the purposes described herein. However greater or lesser thicknesses may be employed if one wishes to emphasize greater durability, or lower cost. A feature of the covers is that they may be color-coded or imprinted for the convenience of the consumer.

The notch 40 formed in cover 36 comprises a "V"-shaped cutting from cover 36, although other types of cuttings are likewise acceptable. Notch 40 includes tapering side edges 41 that extend inwardly to circular opening 42. Cover member 36 is completely reversible so that either the upper surface 43 or lower surface 45 may be disposed against the upper surface 47 of beverage can top 14.

Examples of some possible variations are shown in FIGS. 6-9. The cover member 36a shown in FIG. 6 comprises a "notch" that is substantially hemispherical in shape and includes edges 41a extending inwardly to circular opening 42a. In FIG. 7, cover member 36b includes a notch 40b having generally arcuate sections 41b, that may be advantageous for certain styles of beverage cans. Likewise, the cover member 36c shown in FIG. 8 has a notch 40c that includes arcuate edges 41c. Cover member 36d shown in FIG. 9 includes a plurality of notches 40d and 40e, wherein only notch 40d extends entirely into central circular aperture 42d. The embodiment illustrated in FIG. 9 permits the beverage can opening 30 to be uncovered by any one of notches 40d and 40e.

It is preferable that the cover 36 have an aperture 42 substantially in the center of the cover and contiguous with the notch 40. This aperture is aligned in substantially equivalent position as is the alignment of the rivet on the top of the container, so that when the cover is in place on the container, the aperture 42 surrounds rivet 18 as shown in FIGS. 2 and 3. This aperture enables the cover to rotate smoothly.

With further reference to FIG. 2, the cover 36 is shown in place on the top 14 of the container 12 and aligned in the "covered" position so that opening 30 on the container top 14 is not directly exposed to outside contaminants such as bees or airborne particles. The cover 36 is inserted into the position shown in FIG. 2 by simply aligning notch 40 with the rivet 18, bending cover 36 slightly so that the leading edges 44 of the cover defined by the notched portion are disposed on the container top 14 and below the pull tab 20, and advancing the notched portion 40 inwardly until the central aperture 42 of cover 36 surrounds the rivet 18 attached to the top 14 of the container 12. Cover 36 may be moved from the "covered" position of the container as depicted in FIG. 2, to the "uncovered" position as depicted in FIG. 3 by simple finger pressure onto the cover and rotating the cover into the desired position.

I the preferred embodiment shown in FIG. 3, the angle formed by the "V" shape of the notch is dimensioned so that when the cover and the notch are aligned in this "uncovered" position, portions 49 of the cover overlap opening 30 in the container top. When the consumer takes a drink with the cover aligned in this manner, a film of liquid 46 occupies the space between cover 36 and top 14 of container 12. This is shown in FIG. 10. Because of surface tension forces, this film of liquid 46 assists in adhering cover 36 to the container top 14 and prevents the cover from drifting from the desired position. Similarly, when cover 36 is rotated to the "covered" position as shown in FIG. 2, the liquid prevents the cover from drifting back into the "uncovered" position as shown in FIG. 3. Because of the action of the liquid film 46 adhering cover 36 to container top 14, cover 36 has application to beverage cans which are not provided with the particular tab opener mechanism illustrated herein wherein the tab opener remains with the container after the container is opened. Cover 36 will be retained in place by the combined effect of the upstanding vertical lip 16 and liquid film 46. The liquid will form a thin film 14 that is thick enough to create the desired surface tension but will not be so thick as to cause cover 36 to "float". This regulation of the amount of liquid remaining on the container top after taking a drink is accomplished by the presence of opening 30 in the top that causes excess liquid to drain back into the can.

It has been shown that applicant's invention defines a simple, yet effective, method for covering beverage containers after they have been initially opened. The cover of the present invention is of simple construction, is inexpensive, and may be easily manipulated in order to effect the desired objective of preventing foreign object from entering the container. The device as described is easily inserted on the can, and is easily removed from the can when the beverage has been completely consumed. The device is reusable, which further increases its cost effectiveness.

While this invention has been described as having a preferred embodiment, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. In combination with a beverage container having a top, a tab opener means connected two said top for creating an opening through said top when said tab opener means is actuated, and a circumferential upper lip disposed peripherally around the top and extending above the container top, a cover for said container comprising: a planar disc having an edge, an open notch formed in said disc extending completely to said edge, said disc being removably disposed within a recessed area on said container top within the upper lip, a portion of said disc adjacent said notch being disposed underneath said tab opener means between said tab opener means and said container top, said disc being rotatable so that aid disc selectively covers said container opening and alternatively uncovers said container opening when said notch is aligned with said opening.

2. The combination of claim 1 wherein said disc has an aperture in the center thereof.

3. The combination of claim 2 wherein said tab opener means is connected to said beverage container top by means of a rivet disposed on said container top, and said rivet is disposed within the circular aperture of said disc.

4. The combination of claim 1 wherein said disc is formed of a flexible, resilient material.

5. The combination of claim 1 and including a film of liquid from said container disposed between the cover and said container top whereby said liquid assists in preventing said cover from drifting from the desired position.

6. The container of claim 1 wherein said cover consists essentially of a plastic synthetic material.

7. The combination of claim 1 wherein said cover has a thickness of between 0.005 to 0.070 inch.

8. The combination of claim 1 wherein said notch tapers from the outer edge of the cover toward the center of said disc.

9. The combination of claim 1 wherein edges of the cover defined by the notch are arcuate.

10. The combination of claim 1 wherein said cover has a substantially semi-circular configuration.

11. The combination of claim 10, wherein said tab opener means includes a central rivet connecting said tab opener means to said top, and said disc is rotatable around said central rivet.

12. The combination of claim 11 wherein said disc is formed of a flexible, resilient material.

13. The combination of claim 1 wherein said cover has a plurality of notches formed therein.

14. In combination with a beverage container having a top with a tab opener means connected to said top for creating an opening therethrough, said top having an upstanding lip, a cover for said container comprising a planar disc having a notch therein, said planar disc being removably disposed underneath the tab opener means between the top of the container and the tab opener means and being dimensioned thinner than the height of the container lip and smaller in circumference than the circumference of the lip such that said disc is disposed completely inside the upstanding lip of said top, said disc being rotatable so that it alternatively covers and uncovers the opening in the top of the container, said disc being removable from underneath said tab opener means by sliding said cover from beneath said tab opener means in a direction opposite said notch.

15. In combination with a beverage container having a top, an opening in said top from which a beverage is dispensed, and a circumferential upper edge disposed peripherally around the top and extending above the container top, a cover for said container comprising: a planar disc having a notch formed therein extending to an edge of said cover, and liquid film means disposed between said disc and said beverage container top whereby said liquid film means assists in adhering said disc to said container top and preventing said disc from drifting from the desired position, said disc being rotatable on said beverage container top so that said disc selectively covers said container opening and alternatively uncovers said opening when the notch is aligned with the opening.

16. A method of covering a beverage container having a top with a tab opener associated with the top and an opening through the top which comprises: providing a generally planar disc having a notch therein extending completely to an edge of the disc, aligning the notch of said disc so that it faces the tab opener, sliding said disc into place so that it is completely disposed within a recessed area on said container top and underneath said tab opener between the tab opener and container top, and rotating the disc so that it alternatively covers and uncovers the opening in the container.

17. The method as described in claim 16, wherein the step of sliding said disc into place further comprises bending said disc slightly, and advancing the notch portion of said disc so that said notch portion is disposed below the edge of the container and under the tab opener.

* * * * *